(12) United States Patent
Cam et al.

(10) Patent No.: US 7,751,411 B2
(45) Date of Patent: Jul. 6, 2010

(54) SYSTEM INTERFACE FOR CELL AND/OR PACKET TRANSFER

(75) Inventors: Richard Cam, Vancouver (CA); James R. Hamstra, Tigard, OR (US); Winston Mok, Vancouver (CA); David Wong, Vancouver (CA)

(73) Assignee: PMC-Sierra, Inc., Burnaby (CA)

( * ) Notice: Subject to any disclaimer, the term of this patent is extended or adjusted under 35 U.S.C. 154(b) by 1089 days.

(21) Appl. No.: 09/756,680

(22) Filed: Jan. 10, 2001

(65) Prior Publication Data
US 2002/0126704 A1 Sep. 12, 2002

(51) Int. Cl.
*H04L 12/28* (2006.01)
*H04L 12/56* (2006.01)
*H04J 3/16* (2006.01)
*H04J 3/12* (2006.01)

(52) U.S. Cl. ............... 370/395.6; 370/469; 370/522; 370/524

(58) Field of Classification Search ........... 370/469, 370/395.1, 395.6, 395.61, 395.62, 395.63, 370/395.64, 395.65, 522, 524
See application file for complete search history.

(56) References Cited

U.S. PATENT DOCUMENTS

| | | | | |
|---|---|---|---|---|
| 5,323,398 A * | 6/1994 | Wake et al. | ............ | 370/467 |
| 5,604,743 A * | 2/1997 | Le Guigner et al. | ........ | 370/392 |
| 5,822,309 A * | 10/1998 | Ayanoglu et al. | ........... | 370/315 |
| 5,910,959 A * | 6/1999 | Olafsson et al. | ............ | 714/752 |
| 6,018,657 A * | 1/2000 | Kennedy et al. | ......... | 455/426.1 |
| 6,038,452 A * | 3/2000 | Strawczynski et al. | ...... | 455/446 |
| 6,078,594 A * | 6/2000 | Anderson et al. | ........... | 370/498 |
| 6,122,294 A * | 9/2000 | Hsu et al. | ................... | 370/477 |
| 6,138,028 A * | 10/2000 | Thoma | ...................... | 455/466 |
| 6,144,676 A * | 11/2000 | Hamalainen et al. | ........ | 370/528 |
| 6,201,818 B1 * | 3/2001 | Kokkinen et al. | ........... | 370/485 |
| 6,266,349 B1 * | 7/2001 | Fukui et al. | ................. | 370/515 |
| 6,452,927 B1 * | 9/2002 | Rich | ....................... | 370/395.1 |
| 6,614,807 B1 * | 9/2003 | Mikkila | ..................... | 370/469 |
| 6,647,006 B1 * | 11/2003 | Rasanen | ..................... | 370/345 |
| 6,671,758 B1 * | 12/2003 | Cam et al. | .................. | 710/100 |
| 6,690,670 B1 * | 2/2004 | Castellano | ............... | 370/395.1 |
| 6,741,566 B1 * | 5/2004 | Furlong et al. | .............. | 370/236 |
| 6,754,238 B1 * | 6/2004 | Lentine et al. | .............. | 370/528 |
| 6,760,328 B1 * | 7/2004 | Ofek | .......................... | 370/389 |
| 6,856,612 B1 * | 2/2005 | Bjelland et al. | ............. | 370/338 |
| 6,865,188 B1 * | 3/2005 | Stirling et al. | .............. | 370/460 |
| 7,003,000 B1 * | 2/2006 | Kenney et al. | .............. | 370/528 |
| 2002/0110181 A1 * | 8/2002 | Willenegger | ................ | 375/141 |

OTHER PUBLICATIONS

"Proposal for UTOPIA Level 4 Interface", Document Contribution No. atm99-0137, Feb. 7, 1999.
"Proposal for Extending 64-bit/200 MHz LLD-UTOPIA Level 4 Interface" Document Contribution No. ATM 99-0291, Jun. 19, 1999.

(Continued)

*Primary Examiner*—Ayaz R Sheikh
*Assistant Examiner*—Blanche Wong
(74) *Attorney, Agent, or Firm*—Vermette & Co.

(57) ABSTRACT

A method of interfacing for packet and cell transfer between a first layer device and a second layer device, which includes dividing control information into an in-band portion and an out-of-band portion, transmitting the in-band portion in the data path, and transmitting the out-of-band portion outside of the data path.

12 Claims, 16 Drawing Sheets

OTHER PUBLICATIONS

"Proposal for a Common System Physical Interface Level 4 (SPI) To Support Physical Line Rates of Up to 10 Gbps" Document Contribution No. oif99.127, Oct. 8, 1999.

"The POS-PHY Level 4 Proposal: A Packet/Cell Interface for 10 Gb/s Applications" submitted by PMC-Sierra, Inc. Document Contribution No. oif00.026, Issue 3, Jan. 2000.

ATM Forum, "UTOPIA Level 4 Straw-Ballot Text" Document Contribution No. STR-PHY-UL40-01.01, Feb. 2000.

ATM Forum, "UTOPIA Level 4" Document No. AF-PHY-0144.001, Mar. 2000.

"Suggested Changes to the SPI-4 Phase 2 Baseline Document" submitted by PMC-Sierra, Inc., Document Contribution No. oif2000.099, Issue 4, Apr. 2000.

Optical Internetworking Forum, "System Physical Interface Level 4 (SPI-4) Phase 1: A System Interface for Interconnection Between Physical and Link Layer, or Peer-to-Peer Entities Operating at an OC-192 Rate (10 Gb/s)" Document No. OIF SPI4.01.0, Sep. 28, 2000.

Optical Internetworking Forum, "System Packet Interface Level 4 (SPI-4) Phase 2: OC-192 System Interface for Physical and Link Layer Devices" Document No. OIF-SPI4-02.0, Jan. 2001.

* cited by examiner

PRIOR ART

PRIOR ART

PRIOR ART

FIG. 9

| | Bit 15 | Bit 8 | Bit 7 | Bit 0 |
|---|---|---|---|---|
| Data Word 1 | Byte 1 | | Byte 2 | |
| Data Word 2 | Byte 3 | | Byte 4 | |
| Data Word 3 | Byte 5 | | Byte 6 | |
| Data Word 4 | Byte 7 | | Byte 8 | |
| Data Word 21 | Byte 41 | | Byte 42 | |
| Data Word 22 | Byte 43 | | XX | |

FIG. 10

|  | Bit 15 | Bit 8 | Bit 7 | Bit 0 |
|---|---|---|---|---|
| Data Word 1 | H1 | | H2 | |
| Data Word 2 | H3 | | H4 | |
| Data Word 3 | P1 | | P2 | |
| Data Word 4 | P3 | | P4 | |
| ... | | | | |
| Data Word 25 | P45 | | P46 | |
| Data Word 26 | P47 | | P48 | |

FIG. 11

|  | Bit 15 | Bit 8 | Bit 7 | Bit 0 |
|---|---|---|---|---|
| Data Word 1 | H1 | | H2 | |
| Data Word 2 | H3 | | H4 | |
| Data Word 3 | HEC | | UDF | |
| Data Word 4 | P1 | | P2 | |
| Data Word 5 | P3 | | P4 | |
| ... | | | | |
| Data Word 26 | P45 | | P46 | |
| Data Word 27 | P47 | | P48 | |

SYSTEM INTERFACE FOR CELL AND/OR PACKET TRANSFER

FIELD

The present invention relates to a POS-PHY Level 4 interface for cell and/or packet transfer.

BACKGROUND

Telecommunications equipment hardware for transmission and switching of packetized data are typically realized by interconnections of various integrated circuits. One or more of these integrated circuit devices are used to implement the functions of a layer in the communications protocol stack. The physical layer and link layer functions are typically implemented in separate devices that communicate with each other over a common interface. Such an interface must be designed to enable reliable and efficient data transfer. Various interfaces have been developed over the past few years to meet requirements of particular applications at the time. Recently, some interface proposals have been made to address requirements of packet and ATM cell transfer at data rates of up to 10 Gb/s (OC-192 SONET/SDH and 10 Gb/s Ethernet). The first is "UTOPIA Level 4" af-phy-0144.001, ATM Forum (ref. 1) and the second is "Proposal for a Common System Physical Interface Level 4 (SPI-4) to Support Physical Line Rates of up to 10 Gbps" (also known as SPI-4 Phase 1) Oif99.127, Optical Internetworking Forum (ref. 2).

The following definitions will be useful in the discussions to follow. The transmit data path refers to the signals associated with data transfer from the Link Layer to the physical layer (PHY) device. Conversely, the receive data path refers to transfer from the PHY device to the Link Layer device.

In ref. 1, control and status signals are sent together with payload data (i.e., sent "in-band") in a 32-bit wide data path. As shown in FIG. 1, there are separate transmit and receive data paths. Data (tx_data[31:0], rx_data[31:0]), control (tx_ctrl, rx_ctrl), and clock (tx_clk, rx_clk) lines are all implemented using LVDS I/O, operating at a nominal frequency of 400 MHz. Control and status for transmit data transfer is sent in the receive data path. Likewise, control and status for receive data transfer is sent in the transmit data path. When a control line is high in any given cycle, the corresponding data lines contain control information. Conversely, when a control line is low, the data lines contain payload data. The format of the control information is shown in FIG. 2.

In ref. 2, control and status signals are sent on separate lines (i.e., sent "out-of-band") from the 64-bit data path as shown in FIG. 3. All signals are implemented with HSTL Class 1 I/O, operating at a nominal frequency of 200 MHz. Flow control is accomplished by indicating FIFO full/not full status in a round-robin manner as shown in FIG. 4. When high, TxStart and RxStart indicate the start of a round-robin sequence. Other signal definitions are summarized as follows. TxClk and RxClk are the clock lines. TxAddr[n:1] and RxAddr[n:1] indicate the port associated with the data transfer. TxData[63:0] and RxData[63:0] are used to carry payload data. TxPrty[3:03] and RxPrty[3:0] are parity bits calculated over the TxData and RxData lines. TxSOCP and RXSOCP indicate the start of a cell or packet. TxEOP and RxEOP indicate the cycle containing an end of packet. TxSize[3:0]) and RxSize[3:0] indicate which bytes of a 64-bit word are valid upon end of packet. TxValid and RxValid indicate when the corresponding data lines are valid. TxError and RxError are used to indicate the occurrence of an error condition upon end of packet.

In principle, both ref. 1 and ref. 2 could be used for data transfer in 10 Gb/s applications. However, they suffer from various limitations. Both schemes have very high pin counts (136 and 164 pins for ref. 1 and ref. 2, respectively), which together with pins required for other functions, require larger IC package sizes. Moreover, their high pin counts inherently limit the number of interfaces that can be included in a given device, compared to a lower pin count interface. Both ref. 1 and ref. 2 also consume a relatively high amount of power (estimated at 4.08 and 3.42 W respectively, not including power consumption at the receivers). Both schemes specify only binary (i.e., full/not full) FIFO status information; more detailed FIFO status information could be used by the scheduler at the far end to arrange data transfers to various ports so as to optimize transfer efficiency and to better avoid FIFO overflow and underflow conditions.

Since FIFO status information is sent in-band with data in ref. 1, it is difficult to use such an interface with unidirectional devices on either end (e.g., separate transmit and receive devices on either the PHY or the Link Layer side of the interface). An example for the case of unidirectional link layer devices is shown in FIG. 5, where an interface between those devices is required for sending FIFO status. For example, flow control information from the PHY for the transmit Link Layer device would be received by a Receive Link Layer device, which would then send the information onto the Transmit Link Layer device to complete the feedback loop. Flow control information from the Receive Link Layer device itself would also need to be sent to the Transmit Link Layer device for in-band transmission to the PHY device. This additional interface between the Transmit and Receive Link Layer devices requires not only additional pins (along with attendant additional power consumption), but will also require additional engineering effort to specify and validate.

The control signaling protocol in ref. 1 permits arbitrary insertion of control words at any point during data transfer. Such a protocol is needlessly complicated for the requirements at hand and is difficult to verify. Moreover, since several control words can elapse between one that contains parity information, the control signal (tx_ctrl/rx_ctrl) itself must also be included in the parity calculation if it is also to be protected, It is much simpler to have control words inserted only between data transfers, and to have parity contained in each control word.

With ref. 2, the parity bits protect only the data lines. It would be beneficial to have error protection over not only the data but also the associated control and status lines.

Accordingly, it is an object of the present invention to provide data recovery in the presence of skew between parallel data lines. It is a further object to provide a system interface for packet and cell transfer for OC-192 SONET/SDH and 10 Gb/s Ethernet Applications that have a lower pin count. It is yet another object of the invention to provide such an interface which has a lower power consumption. Another object of the invention is to provide such an interface having a simplified operation with minimal overhead, and better signal integrity. Finally, it is a further object of the invention to provide a system interface which is suitable for unidirectional link layer device implementations with error protection on data and control signals and 3-state flow control indication.

SUMMARY OF THE INVENTION

According to the invention there is provided a method of interfacing for packet and cell transfer between a first layer device and a second layer device, which includes dividing control information into an in-band portion and an out-of-band portion, transmitting the in-band portion in the data path from one of the first and second layer devices to another of said first and second layer devices, and transmitting the out-of-band portion outside of the data path from the another of the first and second layer devices to one of the first and second layer devices.

The in-band portion may be transfer-specific information and the out-of-band information may be FIFO status flow control information so that the interface operates independently in both transmit and receive directions.

A "1 1" framing pattern may be used on a FIFO status channel to mark boundaries of the framing pattern without requiring an out-of-band framing signal.

A training control pattern may be sent sufficiently often in order to allow a receive interface to check and correct for de-skew on start-up and during regular operation to compensate for skew variations due to changes in voltage, temperature, noise and other factors.

The FIFO status channel clock in the direction opposite to the corresponding data path may be used as a reference source for the data path clock transmitting from a side of the interface opposite to the transmitting end of the FIFO status channel. Conversely, the data path clock may be used as a reference source for the FIFO status channel clock transmitting from a side of the interface opposite to the transmitting end of the data path.

A transmitting end of the data path may send data and control signals precisely aligned with respect to a source-synchronous clock as well as the training pattern once every MAX_T, where MAX_T is configurable on start-up. This gives an implementation the flexibility of trading off overhead bandwidth required for sending training patterns and how frequently the receiver can check and correct for de-skew.

Each control word may contain an error-detection code and one or more control words inserted between bounded transfer periods whereby performance of the code is not degraded by overly long transfers.

An end-of-packet event and error codes may be combined into a two-bit code to reduce the number of bits required.

To further improve upon the efficiency of the interface, transfer information referring to a previous transfer and to a next transfer may be contained in one control word.

BRIEF DESCRIPTION OF THE DRAWINGS

Further features and advantages will be apparent from the following detailed description, given by way of example, of a preferred embodiment taken in conjunction with the accompanying drawings, wherein:

FIG. 9 is an example of a 43-byte packet payload transfer data structure;

FIG. 10 is an example of a 52-byte ATM cell payload transfer data structure;

FIG. 11 is an example of a 54-byte ATM cell payload transfer data structure;

DETAILED DESCRIPTION WITH REFERENCE TO THE DRAWINGS

1. Introduction

POS-PHY Level 4 is an interface for packet and cell transfer between a physical layer (PHY) device and a link layer device, for aggregate bandwidths of OC-192 ATM and Packet over SONET/SDH (POS), as well as 10 Gb/s Ethernet applications. This section provides a general overview of the interface. The next section contains more detailed descriptions of the signals and associated operations, data structures, start-up and AC timing parameters.

Figure 1:
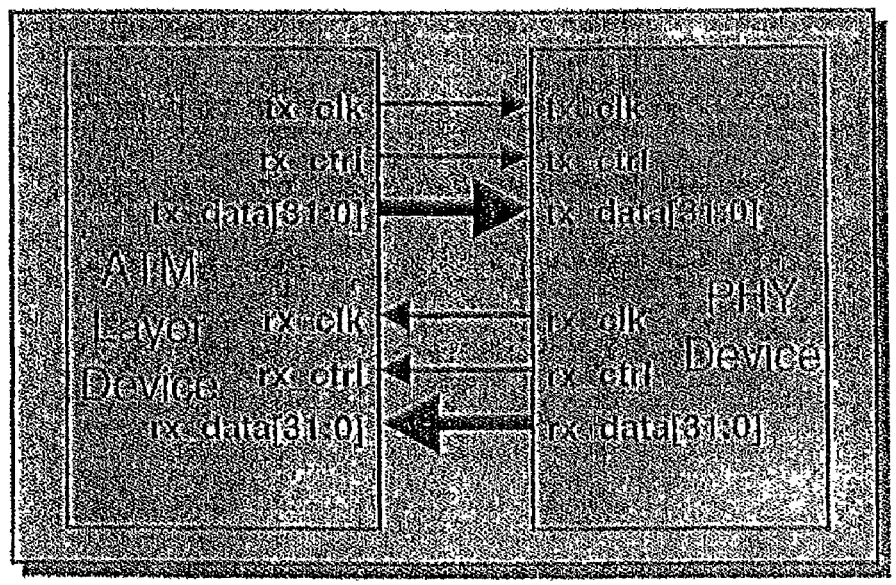
FIG. 1 is schematic diagram of a Utopia Level 4 Interface.
Figure 2:
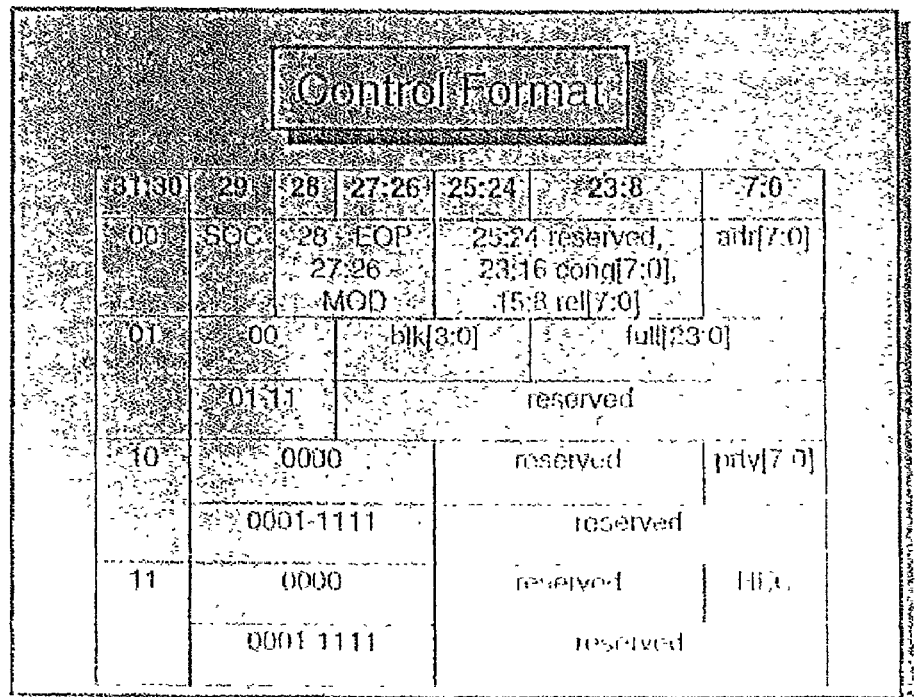
FIG. 2 is a schematic diagram illustrating the Utopia Level 4 control word format.
Figure 3:
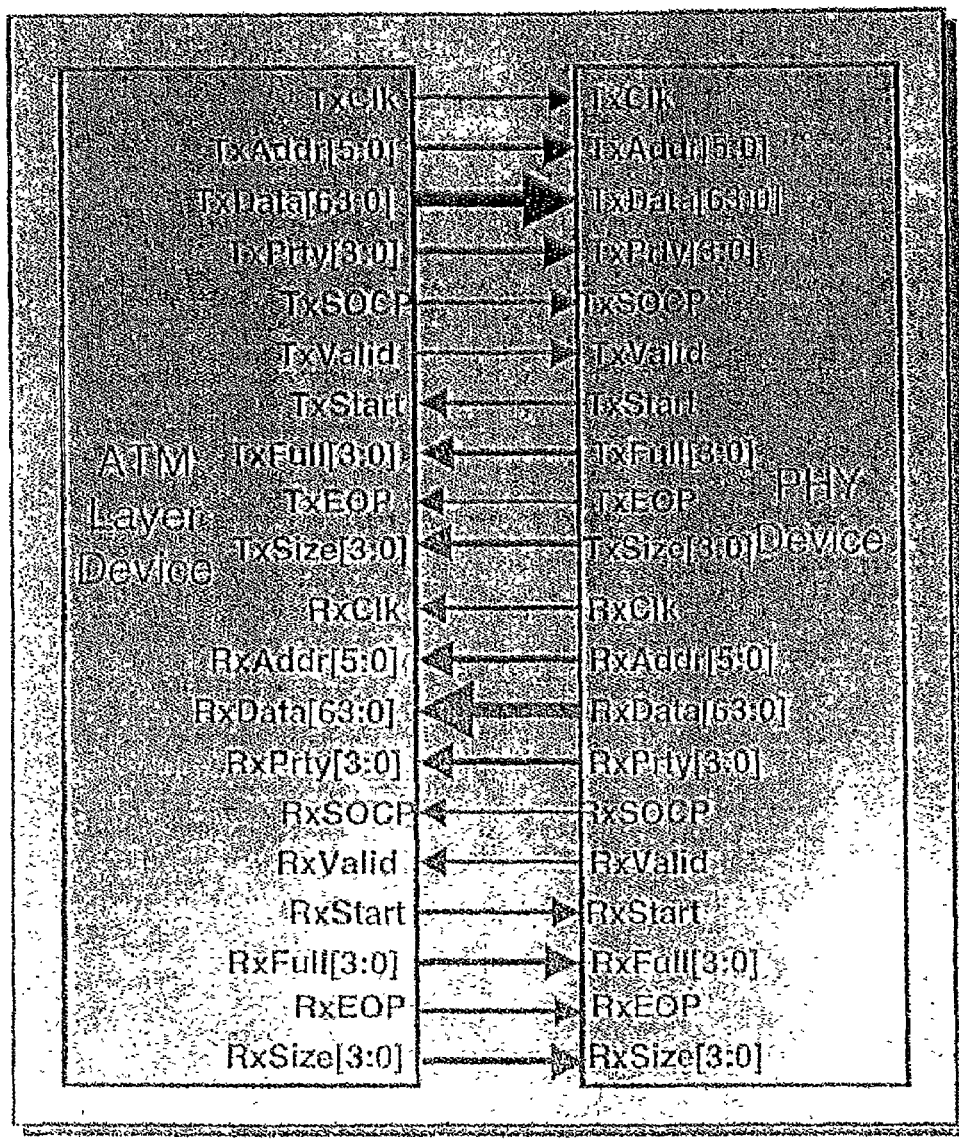
FIG. 3 is a schematic diagram of the System Physical Interface (SPI) Level 4 Phase 1.
Figure 4:
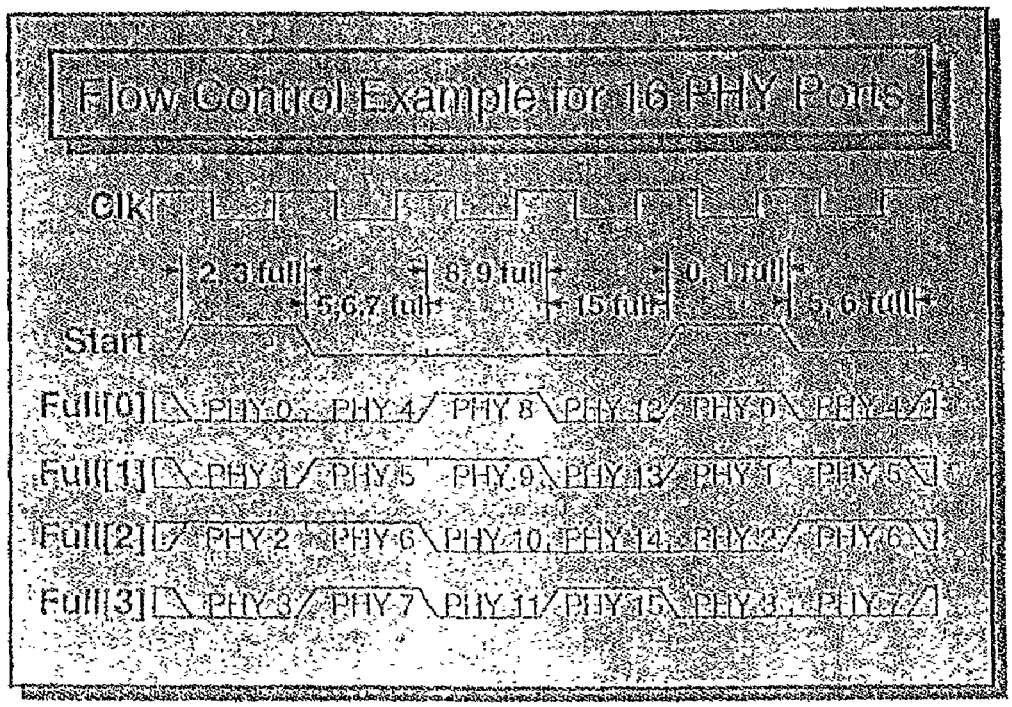
FIG. 4 illustrates the SPI-4 FIFO status indication.
Figure 5:
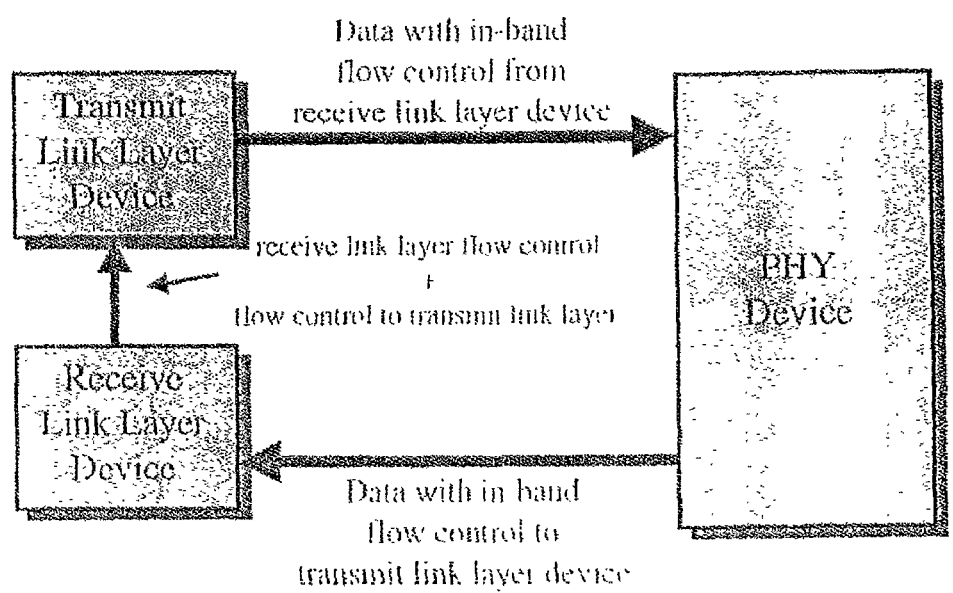
FIG. 5 is a schematic diagram showing an Interface between Transmit and Receive Link Layer Devices.
Figure 6:
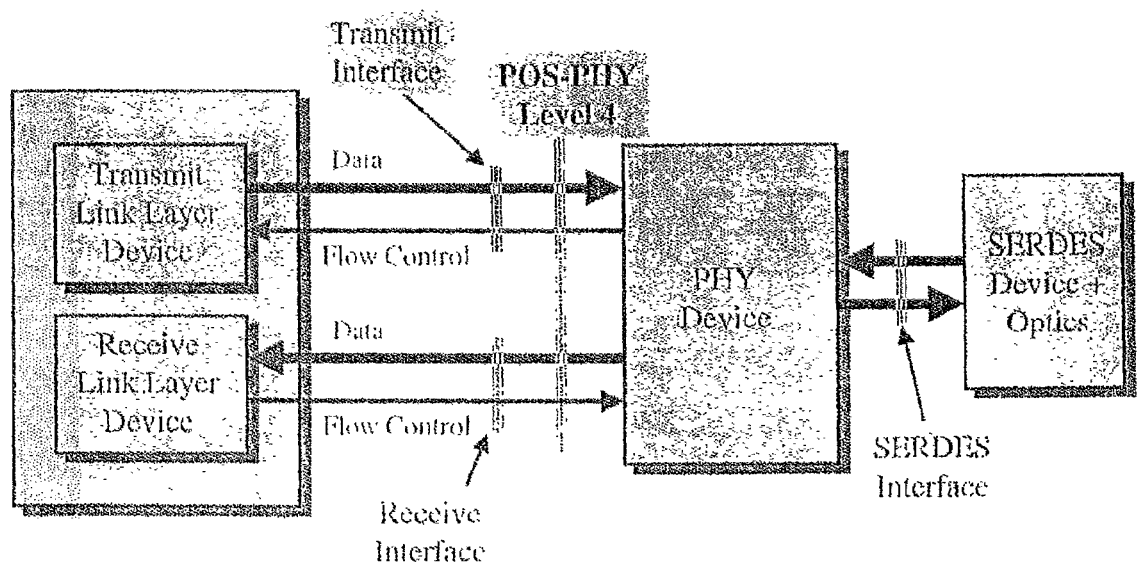
FIG. 6 is a general block diagram of a POS-PHY Level 4 Interface.

The following is a general synopsis of the POS-PHY Level 4 interface. For reference, a general block diagram is shown in FIG. 6. POS-PHY Level 4 is the system packet interface for data transfer between the link layer and the PHY device; it is designed to meet requirements of this particular application, although it may be used in other applications as well. "Transmit" and "Receive" refer, respectively, to data flow and associated control/status information for the Link Layer to PHY, and the PHY to Link Layer directions.

On both the transmit and receive interfaces, FIFO status information is sent separately from the corresponding data path. By taking FIFO status information out-of-band, it is possible to decouple the transmit and receive interfaces so that each operates independently of the other. Such an arrangement makes POS-PHY L4 suitable not only for bidirectional but also for unidirectional link layer devices.

In both the transmit and receive interfaces, the packet's address, delineation information and error control coding is sent in-band with the data.

POS-PHY L4 has the following general characteristics:
Point-to-point connection (i.e., between single PHY and single Link Layer device).
Support for 256 ports (suitable for STS-1 granularity in SONET/SDE applications (192 ports), and Fast Ethernet granularity in Ethernet applications (100 ports)).
Transmit/Receive Data Path:
  16 bits wide.
  In-band port address, start/end-of-packet indication, error-control code.
  LVDS I/O (IEEE 1596.3-1996[1], ANSI/TIA/EIA-644-1995 [2]).
  700 MHz nominal data rate.
  Source-synchronous double-edge clocking, 350 MHz nominal.

Transmit/Receive FIFO Status Interface;
  87.5 MHz nominal clock rate.
  CMOS I/O (3.3 V)
  2-bit parallel FIFO status indication.
  In-band Start-of-FIFO Status signal.
  Source-synchronous clocking.

Figure 7:
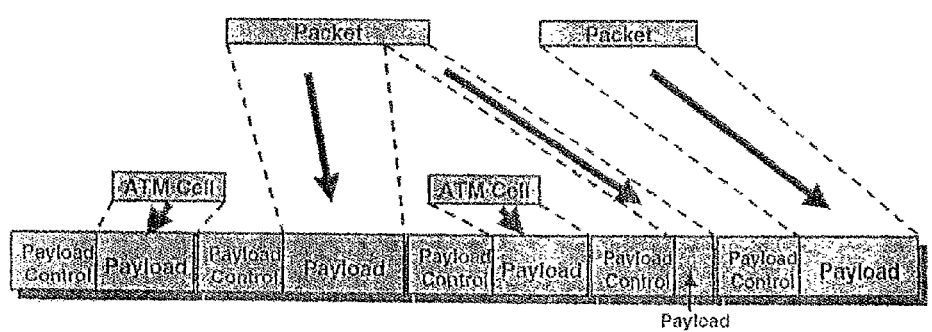
FIG. 7 is a schematic diagram showing the mapping of packets and ATM cells onto a payload stream.

Data is transferred in bursts whose maximum size must be a multiple of 16 bytes. Information associated with each transfer (port address, start/end-of-packet indication and error-control coding) is sent in 16-bit control words described later in this document. FIG. 7 shows how ATM cells and variable-length packets map onto the data stream.

2. Interface Description

Section 2.1 contains signal definitions for the transmit and receive directions. Section 2.2 describes the signal operation along with the data structures for payload data and in-band and out-of-band control/status information. Section 2.3 describes start-up parameters.

2.1 Signals

Figure 8:
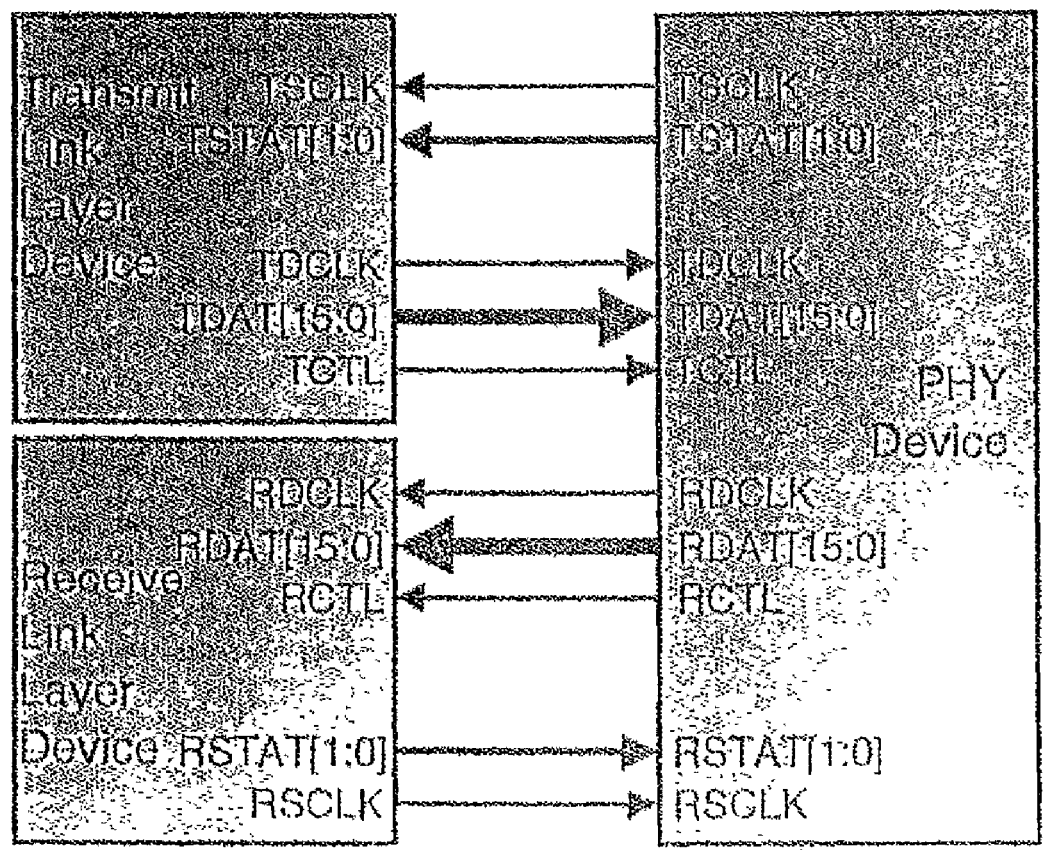
FIG. 8 is a block diagram of the POS-PHY Level 4 Interface showing interface signals.

A block diagram depicting the interface signals is shown in FIG. 8. The transmit and receive data paths include, respectively, (TDCLK, TDAT[15:0], TCTL) and (RDCLK, RDAT[15:01], RCTL). The transmit and receive FIFO status channels include (TSCL, TSTAT[1:0]) and (RSCLK, RSTAT[1:0]) respectively.

TABLE 2.1

POS-PHY Level 4 Interface Signal Summary

| Signal | Direction | Description |
| --- | --- | --- |
| TDCLK | Link to PHY | Transmit Data Clock. Clock associated with TDAT and TCTL. Data and control lines are driven off the rising and falling edges of the clock. |
| TDAT [15:0] | Link to PHY | Transmit Data. Used to carry payload data and in-band control words from the Link Layer to the PHY device. The control word format is described in Section 2.2. |
| TCTL | Link to PHY | Transmit Control. TCTL is high when a control word is present on TDAT[15:0]. It is low otherwise. |
| TSCLK | PHY to Link | Transmit Status Clock. Clock associated with TSTAT. |
| TSTAT [1:0] | PHY to Link | Transmit FIFO Status. Used to carry round-robin FIFO status information, along with associated error detection and framing. |
| RDCLK | PHY to Link | Receive Data Clock. Clock associated with RDAT and RCTL. Data and control lines are driven off the rising and falling edges of the clock. |
| RDAT [15:0] | PHY to Link | Receive Data. Carries payload data and in-band control from the PHY to the Link Layer device. The control word format is described in Section 2.2. |
| RCTL | PHY to Link | Receive Control. RCTL is high when a control word is present on RDAT[15:0]. It is low otherwise. |
| RSCLK | Link to PHY | Receive Status Clock. Clock associated with RSTAT. |
| RSTAT [1:0] | Link to PHY | Receive FIFO Status. Used to carry round-robin FIFO status information, along with associated error detection and framing. |

2.2. Interface Operation Data Structures 2.2.1. Data Path

As shown in FIG. 7, payload data is transferred in bursts. Packets longer than the configured maximum segment size must be segmented into multiple bursts. Control words are inserted only between burst transfers. Once a transfer has begun, data words are sent uninterrupted until end-of-packet or the burst transfer size is reached, whichever comes first. The interval between the end of a given transfer and the next payload control word (marking the start of another transfer) consists of zero or more idle control words or training patterns (Section 2.2.3).

The minimum and maximum supported packet lengths are determined by the application. For ease of implementation however, successive start-of-packets must occur not less than 8 cycles apart (the gap between shorter packets is filled with idle control words).

Payload data bytes are transferred over the interface in the same order as they would be transmitted or received on the line side. The order of bytes within a word is shown in FIGS. 9 to 11. The most significant bits (MSBs) of the constituent bytes correspond to bits 15 and 7. On payload transfers that do not end on a 16-bit boundary, the unused byte (after the last valid byte) is set to all zeroes. FIG. 9 shows an example of the data structure for payload transfer of an arbitrary packet, FIGS. 10 and 11 show the corresponding data structures for a 52-byte ATM cell (i.e., without HEC field) and a 54-byte cell (with HEC and UDF).

A common control word format is used in both the transmit and receive interfaces. Table 2.2 describes the fields in the control word. When inserted in the data path, the control word is aligned such that its MSB is sent on the MSB of the transmit or receive data lines. A payload control word that separates two adjacent burst transfers contains status information pertaining to the previous transfer and the following transfer.

Figure 12:
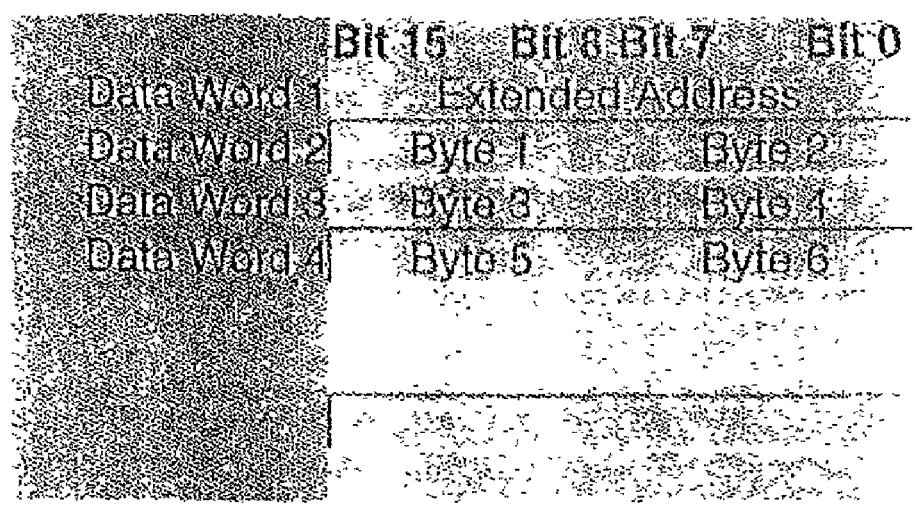
FIG. 12 is an extended data structure.

In order to support addressing requirements beyond 256 ports, as well as additional control functions, an extended data structure is defined, as shown in FIG. 12, in which the first data word of the payload data structure contains a 16-bit extended field. Usage of this field, either by itself, or in conjunction with the 8-bit port address of the preceding control word, is application-specific and beyond the scope of this specification. The extended address field counts as part of the payload transfer size.

TABLE 2.2

Description of Fields in the Control Words

| Bit Position | Label | Description |
| --- | --- | --- |
| 15 | Type | Control Word Type. Set to either of the following values: 1: payload control word (payload transfer will immediately follow the control word). 0: idle or training control word (otherwise). |
| 14:13 | EOPS | End-of-Packet (EOP) Status. Set to the following values below according to the status of the immediately preceding payload transfer. 0 0: Not an EOP. 0 1: EOP Abort (application-specific error condition). 1 0: EOP Normal termination, 2 bytes valid. 1 1: EOP Normal termination, 1 byte valid. EOPS is valid in the first control word following a burst transfer. It is ignored and set to "0 0" otherwise. |
| 12 | SOP | Start-of-Packet. Set to 1 if the payload transfer immediately following the control word corresponds to the start of a packet. Set to 0 otherwise. Set to 0 in all idle and training control words. |

TABLE 2.2-continued

Description of Fields in the Control Words

| Bit Position | Label | Description |
|---|---|---|
| 11:4 | ADR | Port Address. 8-bit port address of the payload data transfer immediately following the control word. None of the addresses are reserved (all are available for payload transfer). Set to all zeroes in all idle control words. Set to all ones in all training control words. |
| 3:0 | DIP-4 | 4-bit Diagonal Interleaved Parity. 4-bit odd parity computed over the current control word and the immediately preceding data words (if any) following the last control word. |

TABLE 2.3

Some Examples of Control Words

| Control Word | Description |
|---|---|
| 0110 00000000 abcd | Idle control word following end of transfer. End-of-packet, normal termination, 1 byte valid in last data word. (Note: abcd bits depend on contents of this control word and preceding transfer.) |
| 0000 00000000 1111 | Idle control word preceded by another (idle) control word. |
| 1101 00000101 abcd | Payload control word following end of transfer. End-of-packet, normal termination, 2 bytes valid in last data word of preceding transfer (abcd bits depend on contents of this control word and preceding transfer). Start-of-packet in next transfer to port 5. |

Figure 13:
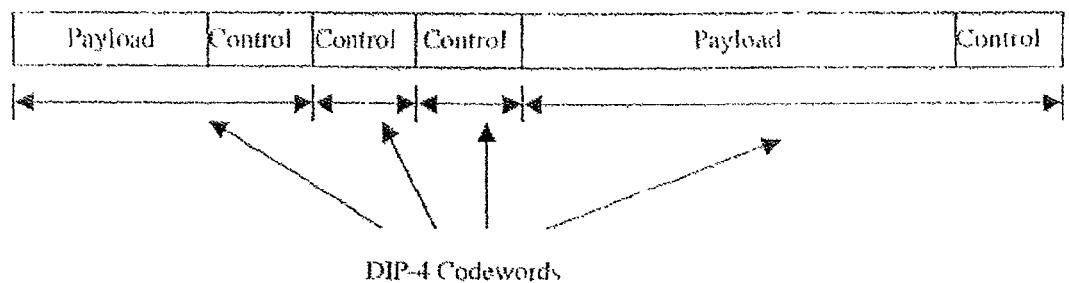
FIG. 13 is a schematic diagram showing the range over which DIP-4 parity bits are computed.
Figure 14:
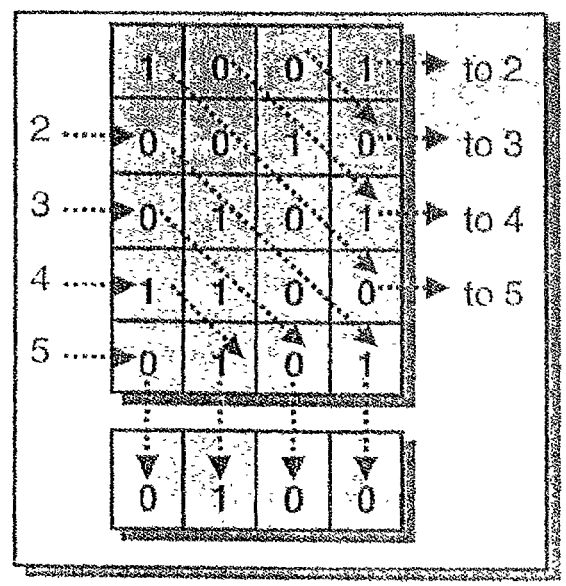
FIG. 14 is a schematic diagram showing an example of DIP-4 odd parity encoding.

FIG. 13 shows the range over which the DIP-4 parity are computed. FIG. 14 shows a sample DIP-4 calculation; a more detailed functional description is given in Section 3. The DIP-4 code is almost as easy to implement as a conventional BIP code. In the presence of random errors, it offers the same error protection capability as a comparable BIP code, but has an additional advantage of spreading single-column errors (as might occur in a single defective line) across the parity bits.

Figure 15:
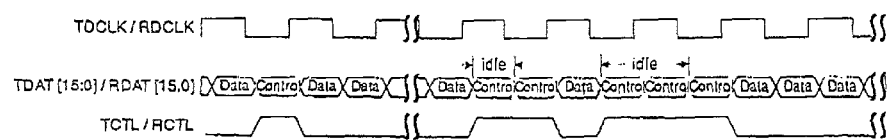
FIG. 15 is a data path timing diagram.

A timing diagram of the data path signals is shown in FIG. 15. This diagram is applicable to either the transmit or the receive interface, TCTL/RCTL is high when TDAT/RDAT contain control words. Idle periods correspond to back-to-back control words.

The actual clock rate used in practice is determined by the application at hand.

2.2.2. FIFO Status Channel

Figure 16:
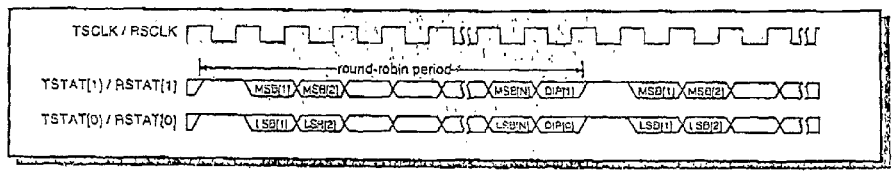
FIG. 16 is a FIFO Status Channel timing diagram.

FIFO status information is sent periodically over the TSTAT serial link from the PHY to the Link Layer device, and over the RSTAT serial link from the Link Layer to the PHY device. Implementation of the FIFO status channel for the transmit interface is mandatory; the corresponding implementation for the receive interface is optional. If both status channels are implemented, they shall operate independently of each other. The FIFO status of each port is encoded in a 2-bit data structure, whose format is defined in FIG. 12. The most significant bit of each port status is sent over TSTAT/RSTAT [1], while the least significant bit is sent over TSTAT/RSTAT [0]. Section 2.3 discusses configuration of the FIFO status port sequence. The port sequences on the transmit and receive interfaces may be configured differently from each other. The "1 1" pattern is reserved for in-band framing; it must be sent once prior to the start of the FIFO status sequence. A DIP-2 odd parity checksum is sent at the end of each complete sequence, immediately before the "1 1" framing pattern. The DIP-2 code is computed over all preceding FIFO status indications sent after the last "1 1" framing pattern, diagonally over TSTAT/RSTAT [1] and TSTAT/RSTAT [0]. A functional description of the DIP-2 code is given in Section 3. While the parity bits can mimic the "1 1" pattern, the receiving end can still frame successfully by synchronizing onto the last cycle in a repeated "1 1" pattern and by making use of the configured length of the sequence (see Section 2.3) when searching for the framing pattern. A timing diagram of the FIFO status channel is shown in FIG. 16. To permit more efficient FIFO utilization, the MaxBurst1 and MaxBurst2 credits are granted and consumed in increments of 16-byte blocks. A burst transfer shorter than 16 bytes (e.g., end-of-packet fragment) will consume an entire 16-byte credit.

A continuous stream of repeated "1 1" framing patterns may be sent to indicate an error condition. For example, it may be sent to indicate that data path de-skew (Section 2.2.3) has not yet been completed or confirmed. When a repeated "1 1" pattern is detected, all outstanding credits are cancelled and set to zero.

The indicated FIFO status is based on the latest available information. A STARVING indication provides additional feedback information, so that transfers can be scheduled accordingly. Applications which do not need to distinguish between HUNGRY and STARVING need only examine the most significant FIFO status bit.

2.2.3. Training Pattern for Data Path Deskew

A training pattern is sent at least once every preconfigured bounded interval on both the transmit and receive interfaces. These training patterns may be used by the receiving end of each interface for de-skewing bit arrival times on the data and control lines. The procedure defined in this section is designed to allow the receiving end to correct for relative skew differences of up to +/−1 bit time. The training pattern consists of 1 idle control word, 10 (repeated) training control words and 10 (repeated) predefined data patterns. The idle control word removes dependencies of the DIP-4 in the training control words from preceding data words. Assuming a maximum of +/−1 bit time in bit alignment jitter on each line, and a maximum of +/−1 bit time relative skew between lines, there will be at least 8 bit times during which a receiver can detect a training control word prior to de-skew. The predefined data pattern is chosen to be orthogonal to the training control word. In the absence of bit errors in the training pattern, a receiver should be able to successfully de-skew the data and control lines with one training pattern.

The sending side of the data path on both the transmit and receive interfaces must send the training pattern in Table 2.5 (in sequence from cycles 1 through 21) at least once every MAX_T payload or idle control words have been sent, where MAX_T is configurable on start-up. Training patterns at the transmit and receive interfaces are scheduled independently. They must not be inserted within a payload burst transfer (i.e., not inserted between a payload control word and any of the subsequent data words until the end of transfer).

TABLE 2.5

| Cycle | TCTL/RCTL | Training Pattern TDAT[i]/RDAT[i] | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| 1 | 1 | 0 | X | X | 0 | 0 | 0 | 0 | 0 | 0 | 0 | 0 | 0 | a | b | c | d |
| 2-11 | 1 | 0 | 0 | 0 | 0 | 1 | 1 | 1 | 1 | 1 | 1 | 1 | 1 | 1 | 1 | 1 | 1 |
| 12-21 | 0 | 1 | 1 | 1 | 1 | 0 | 0 | 0 | 0 | 0 | 0 | 0 | 0 | 0 | 0 | 0 | 0 |

(Note: In cycle 1, XX and abcd depend on the contents of the interval after the last preceding control word.)

2.3. Start-Up Parameters

The sequence of ports at a FIFO status channel is defined in a data structure called CALENDAR, where CALENDAR[i], i=1, . . . , CALENDAR_LEN, refers to the ith port in the repeating sequence. In general, CALENDAR_LEN corresponds to the number of ports with the lowest data rate that can be accommodated in the total data rate of the given application. The calendar sequence (of length CALENDAR_LEN) is repeated CALENDAR_M times before the DIP-2 parity and "1 1" framing words are inserted. CALENDAR_LEN and CALENDAR_M are both greater than zero.

EXAMPLES

1. Single OC-192 or 10 Gb/s Ethernet port: CALENDAR_LEN=1, CALENDAR[1]=1.
2. Four OC-48 ports: CALENDAR_LEN=4, CALENDAR[i]=1, 2, 3, 4.
3. Two OC-48 channels (ports 1 and 2), eight OC-12 channels (ports 3 through 10): CALENDAR_LEN=16, CALENDAR[i]=1, 2, 3, 4, 1, 2, 5, 6, 1, 2, 7, 8, 1, 2, 9, 10, . . . . Other combinations are feasible: CALENDAR[i]=1, 3, 2, 4, 1, 5, 2, 6, 1, 7, 2, 8, 1, 9, 2, 10, . . . .
4. Ten 1 Gb/s Ethernet ports: CALENDAR_LEN=10, CALENDAR[i]=1, 2, 3, 4, 5, 6, 7, 8, 9, 10.

The values of CALENDAR_LEN, CALENDAR_M and CALENDAR[i], i=1 . . . CALENDAR_LEN, must be identical in both the PHY and Link Layer devices for each interface. They need not be identical on both the transmit and receive FIFO status channels, The maximum supported value of CALENDAR_LEN is contained in the parameter MAX_CALENDAR_LEN, whose upper bound is implementation-specific. MAX_CALENDAR_LEN need not be identical on either side of the transmit or receive FIFO status channels. Users however, must ensure that the value of CALENDAR_LEN on the sending side of a FIFO status channel must not exceed MAX_CALENDAR_LEN on the receiving side.

For the FIFO Status channel(s), MaxBurst1 and MaxBurst2 may be configured to apply globally over all ports, or to apply on a per-port basis. In either case, both parameters must be consistently configured at the PHY and Link Layer devices for each interface, but need not be identical between the transmit and receive interfaces.

For the data path de-skew procedure, MAX_T is configured only on the sending side of the data paths on the transmit and receive interfaces. MAX_T need not be identical over both interfaces.

3. Functional Descriptions of the DIP-4 and DIP-2 Codes

This section gives a brief description on how the DIP-4 and DIP-2 codes can be implemented. As shown in FIG. 14, the parity bits are summed diagonally across the parallel lines such that the total number of 1's (counting parity) is an odd number.

For the DIP-2 code used in a FIFO status channel, the computation involves summing diagonally over two columns (TSTAT/RSTAT [1], TSTAT/RSTAT [0]) over all status words since the last "1 1" framing pattern. For the sake of consistency, the status lines relative to FIG. 14 are arranged with the MSB and LSB as the left and right columns respectively, with time moving downward. The parity bits at the bottom are set such that the total number of ones in each diagonal sum (including parity) is an odd number.

Figure 17:
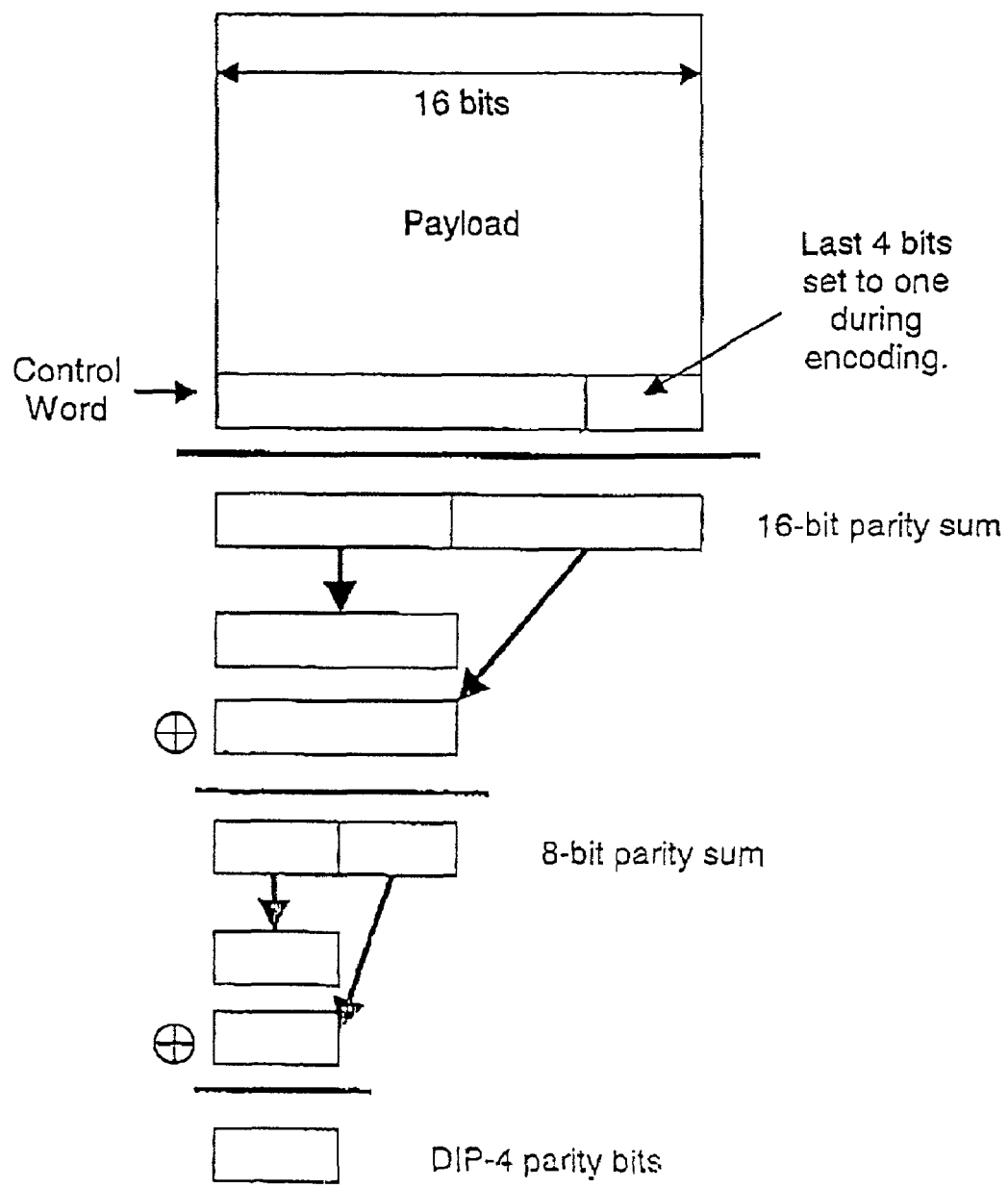
FIG. 17 is a DIP-4 functional diagram showing calculation of the final DIP code.

For the DIP-4 code, assume that the stream of 16-bit data words are arranged as shown in FIG. 17, MSB at the leftmost column, time moving downward. As in FIG. 14, the parity bits are generated by summing diagonally (in the control word, the space occupied by the DIP-4 code is set to all 1's during encoding). The first 16-bit checksum is split into two bytes, which are added to each other modulo-2 to produce an 8-bit checksum. The 8-bit checksum is then divided into two 4-bit nibbles, which are added to each other modulo-2 to produce the final DIP-4 code.

4. Functional Description of Deskew Operation at the Receiver

This section describes a method for implementing data path de-skew using the pattern defined in Table 2.5. The reader is referred to FIGS. 18 and 19 for reference points.

Figure 18:
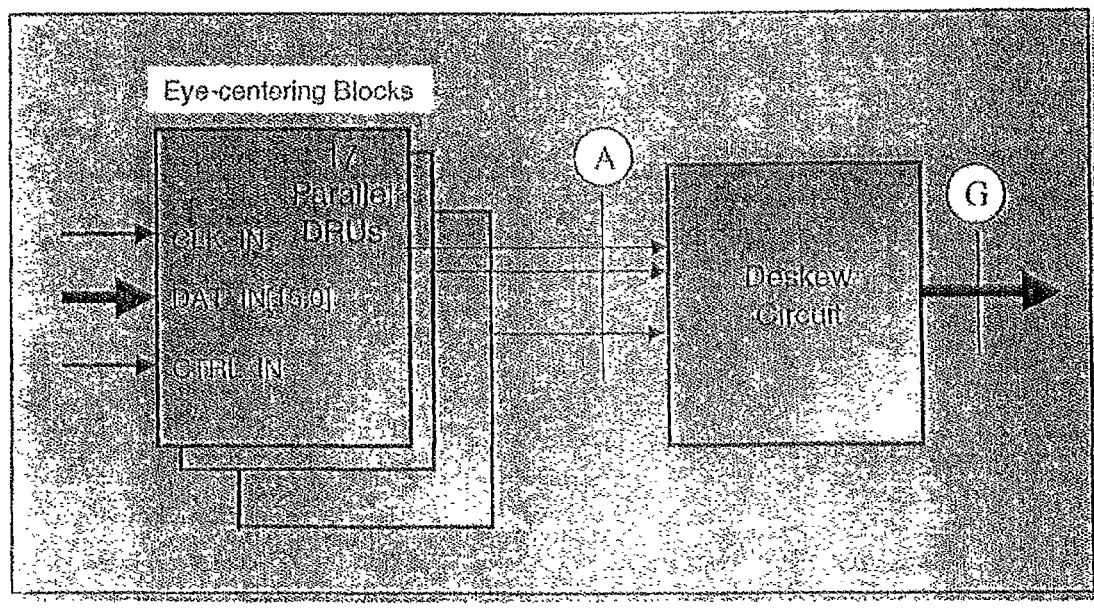
FIG. 18 is a block diagram of the receiver.

In FIG. 18, each of the 17 lines in the data path (16 lines of data (DATA_IN[15:0]), 1 line for control (CTRL_IN)), are independently centered with respect to the received clock (CLK_IN) by data recovery unit (DRU) circuits. Each DRU outputs their respective sampled bits onto de-skew circuit at reference point A.

Figure 19:
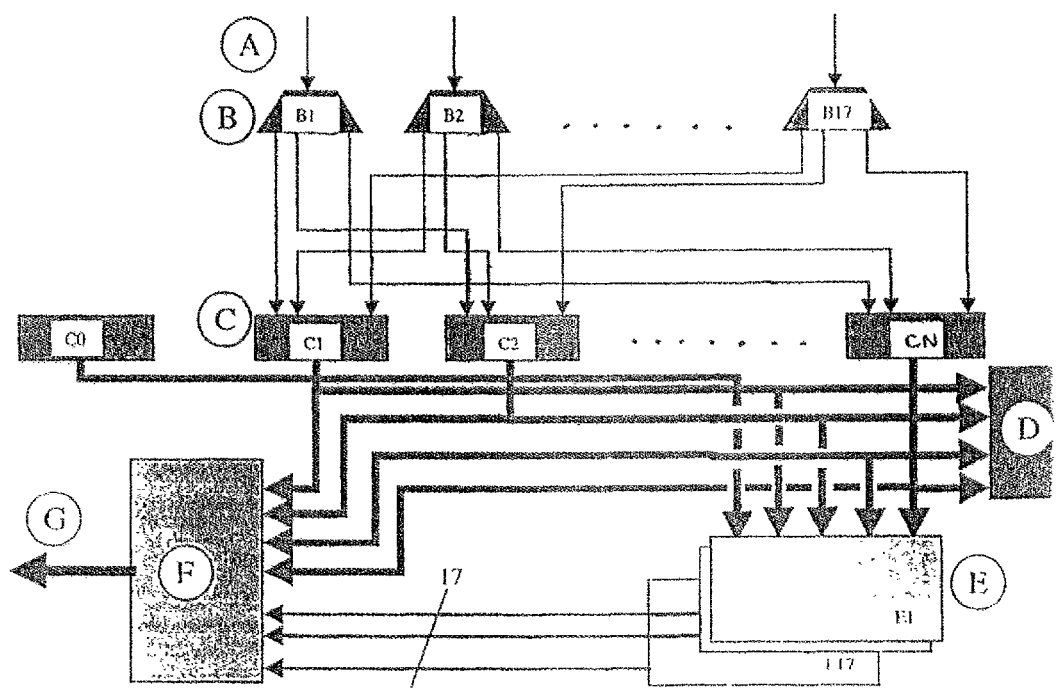
FIG. 19 is a block diagram of the de-skew circuit.

In FIG. 19, each of the 17 lines in reference point A are fed into serial-in parallel-out (SIPO) blocks (B1 through B17) that emit n-bit words at a rate of 1/n the rate of the serial inputs (n=N in FIG. 19). The outputs of blocks B1 to B17 are then fed into a plurality of registers C1 through CN, where N is an integer. At each updated output of the SIPO blocks, registers C1 through CN contain (possibly skewed) samples of the 17-bit data path at time periods, t, t+1, t+2, and t+N−1. C0 contains the sample at time t−1 (which may be obtained from the contents of CN in the previous SIPO update). When an incoming training pattern (as defined in Table 2.5) is received, one or more of the registers C1 to CN should contain a training control word (due to the repetitions of the training control word, and assuming a sufficiently small bit error rate and skew). The contents of C1 through CN are fed into a training detector block (reference point D), which declares detection of a training pattern based on the contents of C1 to CN. The detection scheme may be based on sampling a threshold number of training control words in C1 to CN. Other schemes may also be feasible. Once the training pattern is detected, 17 transition detection blocks (E1 to E17) independently search for the first 1->0 (or 0->1, depending on the bit line) transition that occurs after the last repetition of the training control word. Block Ei searches for the transition on the ith bit position from registers C0 through CN. The registers corresponding to each transition identified by E1 to E17 are fed to an aligner block (reference point F), which selects the appropriate register (from C1 to CN) from which to read each bit in order to present a de-skewed output in reference point G.

As an alternative implementation of the DIP-2 code used at the end of the FIFO status sequence, the parity bits on the FIFO status lines can be defined such that the "1 1" framing pattern is never mimicked. One possible mapping is to use a two-cycle parity mapping as follows:

| 0 | 0 | → | 0 | 0 | 0 | 0 |
| 0 | 1 | → | 0 | 1 | 0 | 1 |
| 1 | 0 | → | 1 | 0 | 1 | 0 |
| 1 | 1 | → | 1 | 0 | 0 | 1 |

Data and control/status paths can be wider (running at correspondingly lower clock rates) or narrower (running at higher clock rates). For example, a 4-bit, 3.5 GHz interface may be used to support similar aggregate bandwidth applications. To support higher bandwidths like OC-768 (40 Gb/s) for example, a 64-bit wide 700 MHz or a 16-bit 3.5 GHz data path may be used. Other combinations of widths and clock rates may also be used for these and other data rates.

Persons skilled in the art will recognize that there are other input/output technologies, data and/or control path widths and clock frequencies which can also be used to implement POS-PHY L4. There are other error control coding schemes that can be used in place of the DIP-4 and DIP-2 codes. Framing for the FIFO status channels can also be implemented out-of-band by using a separate line to provide a frame pulse at the start of the calendar sequence. The transmit and/or receive interfaces can also be operated completely open-loop, without the use of the corresponding FIFO status channels, Clock lines on the data path and FIFO status channels can be eliminated by using a coding scheme like 8b10b (and/or scrambling) and performing associated clock recovery for each line at the receiver. The Link Layer device can exert flow control on the receive interface by means of a receive enable (RENB) signal. When RENB is high, the PHY may transfer as much data possible over the receive interface to the Link Layer device. When RENB is low, the PHY device can transfer only a predefined amount of data until RENB returns back to high. The STARVING indication in the FIFO status channel may be triggered by conditions which indicate that an underflow is imminent, such as the following:

(a) A packet is being transmitted over the line interface (i.e. the FIFO is being emptied);

(b) A corresponding EOP indication for that packet has not yet been received by the PHY device (i.e., not written into its FIFO);

(c) The FIFO level for the given port has dropped below a configured threshold (Starve_Threshold).

Figure 20:
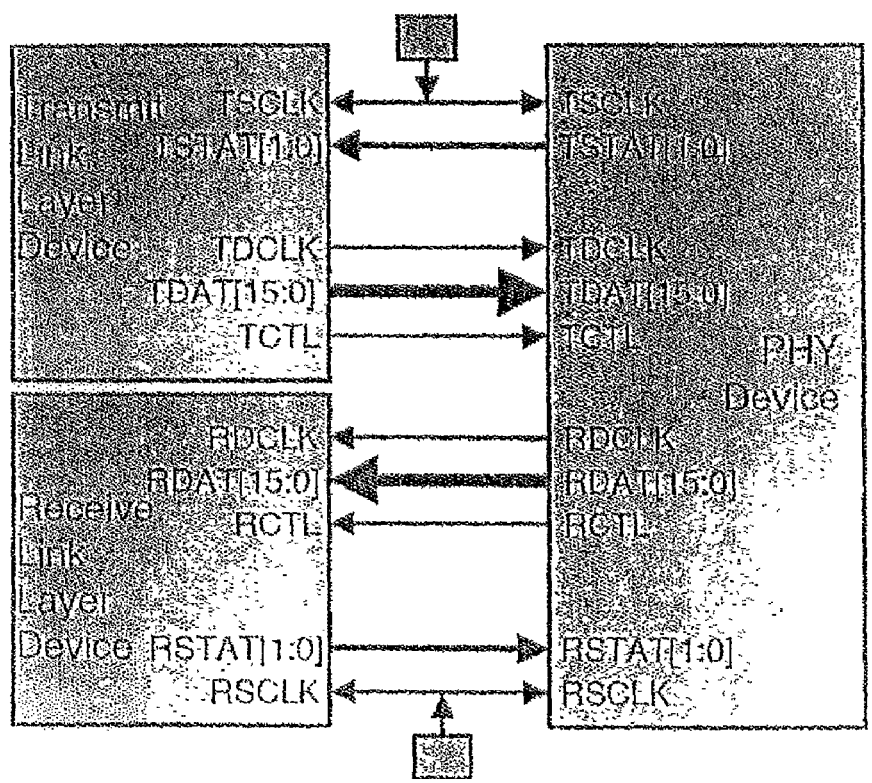
FIG. 20 is a block diagram of a T-clock FIFO Status Channel configuration.

The data and control lines may be scrambled to break long runs of 1's or 0's and a T-clock configuration may be used on the FIFO status channel in place of source-synchronous clocking, as shown below in FIG. 20.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A method of interfacing for the transfer of data in variable length packets and cells, and control information, wherein the transfer takes place between a first layer device and a second layer device over a first physical path and a second physical path, and wherein the control information comprises a plurality of control words, said method comprising the steps of:

Step (a) dividing the control information into an in-band portion and an out-of-band portion;

Step (b) transmitting the in-band portion of the control information and the data along the first physical path from one of the first and second layer devices to the other of the first and second layer devices, wherein the in-band portion control information controls data bus lanes and not data, and wherein the in-band portion of the control information comprises:

i. status information;

ii. a destination address for the data; and, iii. information required to insure alignment of data and control information transmitted along the first and second physical paths from one of the first and second layer devices to the other;

Step (c) inserting a control of data signal into the first physical path of Step (b), wherein the data signal identifies when the path contains the control information and when it contains the data;

Step (d) transmitting the out-of-band portion of the control information of Step (a) along the second physical path, wherein the out-of-band portion comprises credit-based first-in-first-out (FIFO) status flow information; and, Step (e) granting a number of credits to one or more ports, wherein the number of credits granted depends on a state of a corresponding port status;

wherein transmission occurs independently in both transmit and receive directions, whereby re-encoding of data and insertion of control information upon pre-determined intervals is avoided.

2. A method according to claim 1, further comprising the step of marking boundaries of a framing pattern with a "1 1" pattern on a FIFO status channel, wherein an out-of-band framing signal is not required.

3. A method according to claim 1, further comprising the steps of:

Step (f) sending a training control pattern periodically to a receive interface; and, Step (g) using the training control pattern sent by Step (f) to check and correct for skew variations.

4. A method according to claim 3, wherein the data and the control information of the in-band portion of Step (b) are aligned according to a source-synchronous clock, and wherein the data, the control information, and the training control pattern are transmitted at intervals that are configurable on start-up.

5. A method according to claim 1, further comprising the step of transmitting a clock signal in a direction opposite to the transmitting direction of Step (b).

6. A method according to claim 1, further comprising the step of inserting at least one control word between bounded transfer periods for transfer of packets or portions thereof, wherein the control word comprises an error-detection code, whereby performance of the error detection code is not degraded by transfers.

7. A method according to claim 1, further comprising the step of combining an end-of-packet event and at least one error code into a two-bit code.

8. A method according to claim 1, wherein the control information of at least one control word applies to i) data preceding the one control word, and, ii) data following the one control word.

9. A method according to claim 1, wherein the first layer device is a physical layer (PHY) device, and wherein the second layer device is a link layer device.

10. A method according to claim 1, wherein:
   i. the in-band portion of the control information includes packet address, delineation, and error control coding;
   ii. the out-of-band portion of the control information comprises FIFO status flow information; and,
   iii. an interface between the first layer device and the second layer device operates independently in both transmit and receive directions.

11. A de-skewing circuit, comprising:
   (a) N serial input data lines, wherein N is an integer greater than zero;
   (b) N serial-in parallel-out (SIPO) blocks, wherein each of said SIPO blocks comprises an N-bit parallel output, and wherein each SIPO block is coupled to a respective one of said serial input data lines, whereby serial data transmitted to said SIPO blocks is converted to N-bit parallel output data comprising separate output for each bit of said N-bit parallel output data;
   (c) N register sets, wherein each register set is coupled to a respective one of said SIPO blocks, and wherein each of said register sets stores the most recent n-bit words of data arriving on each of said input data lines;
   (d) a training detector block coupled to outputs of said register sets, wherein said training detector block detects the presence of a training pattern based on the contents of said register sets;
   (e) N transition detection blocks, wherein:
      i. each of said transition blocks comprises N inputs;
      ii. each of said inputs is coupled to an output of a respective one of said register sets; and,
      iii. after the presence of the training pattern has been detected within said register sets by said training detection block, said transition detection blocks independently search for a transition of bits within the training pattern detected by said training detector block; and,
   (f) an aligner block, wherein said aligner block is coupled to outputs from said transition detection blocks and to outputs of said register sets, and wherein said aligner block selects a register set from which to read each of N bits from the selected register set, whereby variable length packet and cell transfers are corrected for relative skew differences of up to plus or minus [+/−] 1 bit time.

12. The de-skewing circuit of claim 11 wherein N is equal to 17.

* * * * *